Jan. 11, 1966 R. LA ROSA 3,229,215

PARAMETRIC AMPLIFIER WITH PUMP FEED ACROSS CAPACITIVE GAP

Filed Dec. 11, 1962 2 Sheets-Sheet 1

United States Patent Office 3,229,215
Patented Jan. 11, 1966

3,229,215
PARAMETRIC AMPLIFIER WITH PUMP FEED ACROSS CAPACITIVE GAP

Richard La Rosa, South Hempstead, N.Y., assignor to Hazeltine Research, Inc., a corporation of Illinois
Filed Dec. 11, 1962, Ser. No. 243,878
8 Claims. (Cl. 330—4.9)

This invention relates to parametric amplifiers and, more particularly, to arrangements for supplying pump signals to variable reactance elements in such amplifiers via a capacitive gap. This type of feed avoids bandwidth limitations resulting from other types of pump signal feeds which may, for example, introduce undesirable inductances into the amplifier circuit by utilizing inductive irises. The invention will be described with particular reference to one-port parametric amplifiers of the type utilizing a variable capacitance diode as the active element.

The objects of this invention are to provide new and improved parametric amplifiers which avoid bandwidth limitations and other disadvantages of prior art amplifiers through utilization of a capacitive gap for coupling pump signals to variable reactance devices.

In accordance with the invention, a parametric amplifier of the type wherein the reactance of a variable reactance device is periodically varied by pump signals comprises a variable reactance device, a coaxial transmission line structure having an inner conductor adapted to hold the reactance device and a surrounding outer conductor having an essentially continuous circumferential capacitive gap near the point at which the reactance device is held by the inner conductor, and means for coupling pump signals to the reactance device via the capacitive gap.

For a better understanding of the present invention, together with other and further objects thereof, reference is had to the following description, taken in connection with the accompanying drawings, and its scope will be pointed out in the appended claims.

Referring to the drawings.

Figure 1:
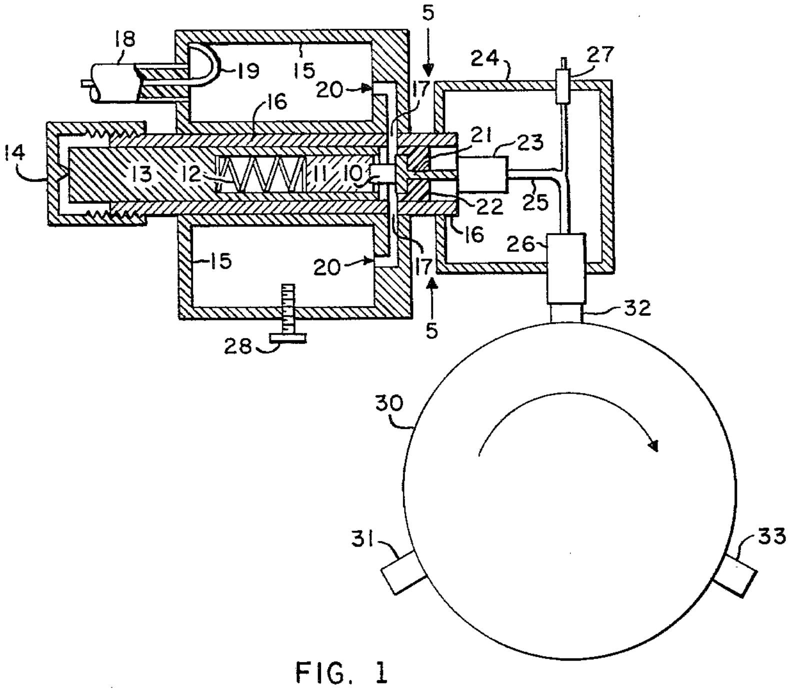
FIG. 1 is a sectional view of an actual amplifier constructed in accordance with the invention (in which certain dimensions have been distorted in the interests of clarity of illustration)

*Description of complete FIG. 1 amplifier*

Referring now to FIG. 1, there is shown a complete parametric amplifier in accordance with the invention. This complete device will be described first, and then the particular components comprising the invention will be described in greater detail. FIG. 1 is a sketch of a cross section of an actual one-port parametric amplifier designed for use in the UHF range. Before describing this amplifier, it may help to point out that, in the drawing, substantially all parts to the left of the arrows labeled 5 are cylindrical in form and are essentially radially symmetrical.

The variable reactance device used is a variable capacitance diode 10 which has the form of a cylinder about an eighth of an inch high and an eighth of an inch in diameter. The contact existing at one end of this diode is held by a frictional fitting in the end of a spring-loaded piston 11. The other end of the spring 12, which loads the piston 11, presses against a plunger 13, which completely surrounds the piston 11 and partially surrounds the diode 10. A threaded knob 14 presses against this plunger 13 to adjust its position. This plunger 13 provides a small idler tuning inductance $L_3$, which will be referred to below. Surrounding the diode 10 and the components 11, 12, and 13 is a cylindrical outer conductor 16 whose position is fixed relative to cavity 15. The outer conductor 16 of the diode enclosure is broken by a capacitive gap 17, which opens into the end of a coaxial angular cavity 15 surrounding the outer conductor 16. The cavity 15 is tuned to pump frequency and is fed by a coaxial line 18 which terminates in a loop 19 which protrudes into the cavity 15. The cavity 15 has an annular opening 20 in one end which leads to the capacitive gap 17. In considering the mechanical relation of the various components, it should be pointed out that plunger 13 is slidably positioned inside outer conductor 16 and piston 11 is slidably positioned inside plunger 13.

The spring loading of the piston 11 causes the contact existing at the other end of the diode 10 to be pressed against a contact 21, which is supported by a dielectric piece 22. As shown, the dielectric piece fits inside the section of the outer conductor 16 appearing to the right of the capacitive gap 17. The contact 21 has attached thereto a conductor leading to a choke 23. The choke 23 is designed to have electrical characteristics so as to present substantially an open circuit at idler, pump and upper sideband frequencies so that no microwave energy gets from the diode portion of the circuit into the UHF circuit shielding box 24.

Connected to the choke 23 is a conductor 25 which leads to a coaxial connector 26 and a feed-through capacitor 27. The feed-through capacitor 27 is utilized in providing a filtered bias signal to the diode 10 from an outside source. To the coaxial connector 26 there is shown connected a ferrite circulator 30 of conventional construction. There is also included in the drawing a capacitive tuning screw 28 for adjusting the resonant frequency of the cavity 15.

The general theory of operation of parametric amplifiers is well understood by workers in the art, and it will suffice here to summarily describe the operation before proceeding to a detailed description of the invention. Information signals to be amplified are fed to connector 31 of the circulator 30 and are thereby coupled to the connector 32 and then to the diode 10 via contact 21. As is well known in this art, if the capacitance of the diode 10 is varied properly by a pump signal, input information signals will be reflected by the diode 10 with amplification and will then travel back to the circulator 30 which, due to its nonreciprocal properties, will couple these signals to the signal output connector 33 for further utilization. In amplifiers in accordance with the present invention, the required pump signals are supplied to the diode 10 via a capacitive gap 17 which will be described in more detail below.

The function of the pump feed cavity 15 is to establish a large pump signal current through the comparatively low reactance of the capacitive gap 17. At idler frequency, the capacitance of the gap 17 is essentially not shunted by the cavity which has a fairly high impedance at frequencies differing from its resonance. At the signal frequency, however, the conducting path formed by the cavity has a low enough inductance to effectively short-out the capacitance of the gap 17. At idler frequency, the diode circuit is completed by the capacitance to ground through the dielectric piece 22.

*Description of invention in greater detail*

Referring now more particularly to the present invention, in FIG. 1 there is shown a parametric amplifier of the type wherein the resistance of a variable reactance device is varied by pump signals. This amplifier includes a variable reactance device shown as variable capacitance diode 10 and a coaxial transmission line structure having an inner conductor adapted to hold the diode 10 and a surrounding outer conductor. As shown, the inner conductor includes a contact 21 against which the diode 10 is held by piston 11 which is loaded by spring 12. Piston 11 is in electrical contact with plunger 13, which, in turn, is in electrical contact with the cylindrical outer conductor 16. Thus, it will be seen that the coaxial transmission line is effectively shorted at the left end of the diode 10, as shown, and contact 21 forms part of the inner conductor which is utilized in coupling information signals to diode 10. The surrounding outer conductor 16 of the coaxial transmission line structure is shown as having a continuous circumferential capacitance gap near the point at which the diode 10 is held by components of the inner conductor. The amplifier also includes means for supplying pump signals, shown as coaxial line 18 and loop 19, and means for coupling pump signals to the reactive device 10 via the capacitive gap 17. These last means are shown as a cavity 15 coaxially surrounding the outer conductor 16 and resonant at substantially the frequency of the pump signals. As shown, the amplifier finally includes means for coupling information signals to the diode 10 for amplification, including contact 21, trap 23, conductor 25, and circulator 30, which is effective to separate incoming information signals from outgoing amplified information signals.

Figure 2:
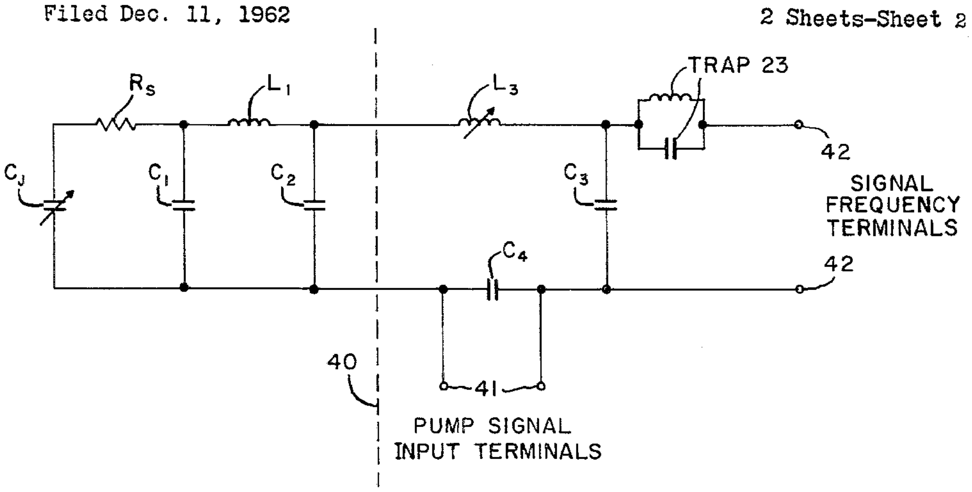
FIG. 2 is a schematic diagram of the FIG. 1 arrangement.

Consideration of the operation of a parametric amplifier utilizing the present invention can best be approached by considering the equivalent circuit of a variable capacitance diode as shown in FIG. 2 to the left of the dotted line labeled 40. In FIG. 2, $C_J$ is the variable junction capacitance of the diode 10, $R_S$ is the series resistance of that junction, $C_1$ is the stray capacitance across the junction, $L_1$ is the inductance of the mechanical components holding the diode in an amplifier, and $C_2$ is the stray capacitance across the terminals of the diode. The equivalent circuit is actually more complicated, but this equivalent circuit is accurate enough for present purposes. For large bandwidth in a reflection type parametric amplifier of the type under discussion (also called a one-port amplifier), it is important that no inductance be added in the external idler circuit. One of the principal design problems is reducing the inductance of the diode mount so that the greatest idler bandwidth can be obtained.

The arrangement shown in FIG. 1 results in a low inductance mounting for the diode 10. The complete circuit of FIG. 2 represents a simplified equivalent circuit of the FIG. 1 amplifier. Variable inductance $L_3$ represents the effect caused by the extreme right-hand extremities of plunger 13 which partially surrounds the diode 10 so as to provide a low inductance which can be varied by turning the threaded knob 14 so as to cause the plunger 13 to move in or out as desired. Capacitance $C_3$ represents the effect caused by the contact 21 and dielectric piece 22. Capacitance $C_4$ represents the capacitance of the capacitive gap 17 across which pump signals are developed by the resonant cavity 15 and probe 19, which are represented in FIG. 2 by pump signal input terminals 41. Signal frequency terminals 42 in FIG. 2 represent the coaxial connector 26 in FIG. 1 which connects to the trap 23 as shown.

As a practical matter, the capacitive gap 17 has to be enclosed in some way, as for example by the use of a surrounding cavity. In the amplifier of FIG. 1, a cavity 15, which can be tuned to resonate with the gap and diode reactances at pump frequency, is provided. If a cavity is used, it should have a fairly high impedance so that off resonance it does not put much susceptance in parallel with the capacitance $C_4$ of the gap 17. A cavity or resonator can be formed using a radial transmission line section, waveguide, ridge waveguide, a coaxial cavity as shown in FIG. 1, or other arrangements which will be evident to those skilled in the art. It will be appreciated in this regard that the basic function required is that of a matching network to tune out the capacitance of the gap at pump frequency; this function is provided by the cavity in the illustrated example. The example illustrated in FIG. 1 uses a coaxial cavity 15 whose electrical length is slightly greater than a half wavelength long at pump frequency to resonate with the capacitance $C_4$ of the gap 17 in parallel with the diode circuit which is detuned at pump frequency.

Values of the variables involved in one amplifier constructed in accordance with the invention were substantially as follows:

| | |
|---|---|
| Signal frequency, mc. | 425 ± 25 |
| Pump frequency, mc. | 5925 |
| Idler frequency, mc. | 5500 ± 25 |
| Upper sideband frequency, mc. | 6350 ± 25 |
| $C_J$, $\mu\mu$f. | 1.8 |
| $R_S$, ohms | 1.8 |
| $C_1$, $\mu\mu$f. | 0.12 |
| $L_1$, m$\mu$h. | 1.2 |
| $C_2$, $\mu\mu$f. | 0.12 |
| $L_3$, m$\mu$h. (approx.) | 0.8 |
| $C_3$, $\mu\mu$f. | 2 |
| $C_4$, $\mu\mu$f. | 10 |
| Characteristic impedance of line 18, ohms | 50 |

Figure 3:
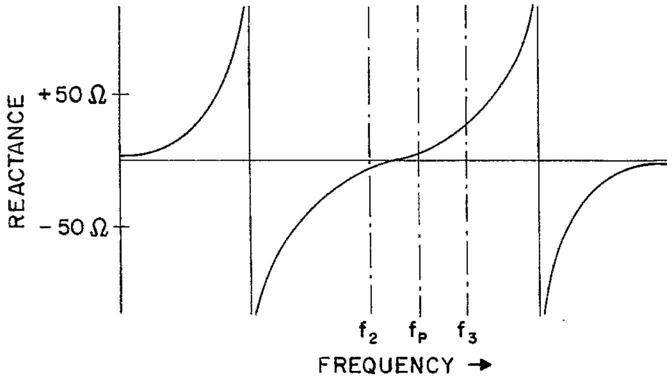
FIGS. 3 and 4 are reactance diagrams useful in describing certain attributes of the invention.
Figure 4:
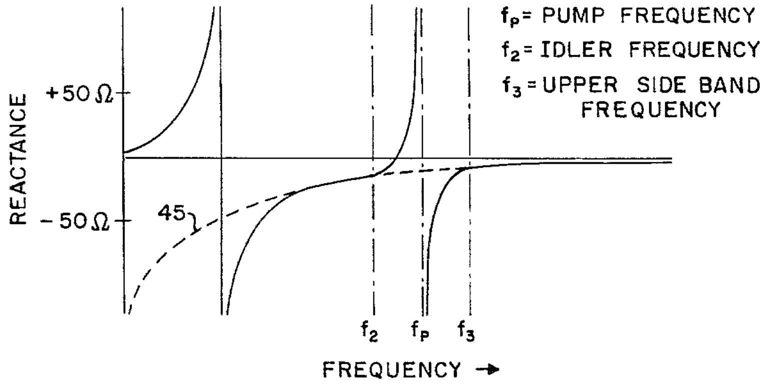

In this particular amplifier, the diode and its associated elements, including $L_3$ and $C_3$ in parallel with $C_4$, had an effective reactance of about −4.2 ohms and a small amount of resistance. The pump cavity length was 180°+4.8° to resonate with that impedance. Theoretically, the cavity could have been constructed only 4.8° long, but it was found preferable to utilize a cavity 184.8° long instead. With the 184.8° long cavity, the reactance diagram is as shown in FIG. 3. The reactance of the cavity in parallel with the capacitance $C_4$ of the gap 17 is shown in FIG. 4. Both FIGS. 3 and 4 assume no coupling of the pump feed loop so that there is only reactance involved. When the pump loop is coupled to the pump oscillator there is actually some resistance introduced at the pump frequency, but not at the other frequencies. The dotted curve labeled 45 in FIG. 4 represents the reactance of the capacitive gap 17 alone. It will be seen that in the neighborhood of idler frequency, the cavity has the effect of reducing the capacitive reactance and increasing its slope. This slightly narrows the idler bandwidth, but it is a very minor effect compared to the effect of additional inductance which should be introduced into the idler mesh if as hunt inductive iris were used rather than a series capacitive gap. In the amplifier under discussion, the inner diameter of the outer wall of the coaxial cavity 15 was 0.506 inch and the outer diameter of the inner wall was 0.220 inch. The inner diameter of the outer conductor 16 enclosing the diode was 0.180 inch.

In this example, a coaxial cavity 15 was used. The diameter of the outer conductor is small enough to insure that no higher order modes exist and that the periphery of the capacitive gap is uniformly excited. Substantial care must be taken if the capacitive gap is not uniformly excited because the dimensions of the capacitor may be such as to produce a subsidiary resonance with consequent loss of power and difficulty in adjustment of the circuit.

In order to allow for tuning of the cavity 15, it was made slightly shorter (about 2 percent) than actually required, and a tuning screw 28 was provided at the high voltage point to add capacitance and adjust the resonant frequency of the cavity.

Thus, it will be seen that whereas prior parametric amplifiers of the type under discussion have relied upon such provisions as inductive irises in the coupling of pump signals, the present invention avoids such arrangements (which had the effect of introducing undesirable inductances so as to narrow the idler bandwidth) by utilizing a series capacitive gap which actually helps to increase the available bandwidth.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A parametric amplifier, of the type wherein the reactance of a variable reactance device is periodically varied by pump signals, comprising:
a variable reactance device;
a coaxial transmission line structure having an inner conductor adapted to hold said reactance device and a surrounding outer conductor having an essentially continuous circumferential capacitive gap near the point at which said reactance device is held by said inner conductor;
and means for coupling pump signals to said reactance device via said capacitive gap.

2. A parametric amplifier, of the type wherein the reactance of a variable reactance device is periodically varied by pump signals, comprising:
a variable reactance device;
a coaxial transmission line structure having an inner conductor adapted to hold said reactance device and a surrounding outer conductor having an essentially continuous circumferential capacitive gap near the point at which said reactance device is held by said inner conductor;
and means surrounding said outer conductor and resonant at substantially the frequency of the pump signals utilized, for coupling pump signals to said reactance device via said capacitive gap.

3. A parametric amplifier, of the type wherein the reactance of a variable reactance device is periodically varied by pump signals, comprising:
a variable reactance device;
a coaxial transmission line structure having an inner conductor adapted to hold said reactance device and a surrounding outer conductor having an essentially continuous circumferential capacitive gap near the point at which said reactance device is held by said inner conductor, and including a matching network to tune out the capacitance of the gap at pump frequency;
and means surrounding said outer conductor and resonant at substantially the frequency of the pump signals utilized, for coupling pump signals to said reactance device via said capacitive gap.

4. A parametric amplifier of the type wherein the capacitance of a variable capacitance diode is periodically varied by pump signals, comprising:
a variable capacitance diode;
a coaxial transmission line structure having an inner conductor adapted to hold said diode and a surrounding outer conductor having an essentially continuous circumferential capacitive gap near the point at which said diode is held by said inner conductor;
means for supplying pump signals;
and means for coupling said pump signals to said diode via said capacitive gap.

5. A parametric amplifier, of the type wherein the reactance of a variable reactance device is periodically varied by pump signals, comprising:
a variable reactance device;
a coaxial transmission line structure having an inner conductor adapted to hold said reactance device and a surrounding outer conductor having an essentially continuous circumemferential capacitive gap near the point at which said reactance device is held by said inner conductor;
means for supplying pump signals;
means for coupling said pump signals to said reactance device via said capacitive gap;
and means for coupling information signals to said reactance device for amplification.

6. A parametric amplifier of the type wherein the capacitance of a variable capacitance diode is periodically varied by pump signals, comprising:
a variable capcitance diode;
a coaxial transmission line structure having an inner conductor adapted to hold said diode and a surrounding outer conductor having an essential continuous circumferential capacitive gap near the point at which said diode is held by said inner conductor;
means for supplying pump signals including a matching network connecting the capacitive gap to a source of pump signals via a transmission line and specifically including a cavity, coaxialy surrounding said outer conductor and resonant at substantially the frequency of said pump signals, for coupling said pump signals to said diode via said capacitive gap;
and means for coupling information signals to said diode for amplification including means for separating incoming information signals from outgoing amplified information signals.

7. A parametric amplifier of the type wherein the capacitance of a variable capacitance diode is periodically varied by pump signals comprising:
signal-handling means for providing input information signals to be amplified and for receiving outgoing amplified information signals;
a variable capacitance diode having two terminals;
a low inductance mounting for said diode including a coaxial transmission line structure having an inner conductor adapted to hold said diode, with one portion of said inner conductor coupling one terminal of the diode to said signal-handling means and another portion of said inner conductor coupling the other terminal of the diode to an outer conductor which surrounds the inner conductor and the diode, said outer conductor having an essentially continuous circumferential capacitive gap adjacent the diode;
and means, including a coaxial cavity surrounding said outer conductor, for tuning out the capacitance of said gap at pump frequency and for coupling pump signals to said diode via said capacitive gap so as to periodically vary the capacitance of the diode to cause amplification of input information signals of the proper frequency relative to said pump signals.

8. A parametric amplifier of the type wherein the capacitance of a variable capacitance diode is periodically varied by pump signals comprising:
a variable capacitance diode having two terminals;
a first cylindrical metal contact for frictionally grasping one terminal of said diode;
a first hollow metal cylinder, having one closed end and an inner spring, for surrounding and slidably holding said cylindrical contact so that the diode protrudes from the open end of said first cylinder;
a second hollow metal cylinder, having an adjustable moveable end cap, for surrounding and slideably holding said first cylinder and having a continuous circumferential gap adjacent said diode;
a coaxial metal cavity, surrounding said second cylinder and having a circumferential opening which coincides with said circumferential gap, said cavity being resonant at a predetermined pump frequency and being constructed to permit electromagnetic energy of said predetermined pump frequency to be introduced into said cavity;
a second metal contact, supported within said second cylinder by a dielectric member, in electrical contact with the remaining terminal of said diode;

a choke, connected to an extension of said second contact, constructed to present substantially an open circuit for idler, pump, and upper sideband frequencies;

and external circuitry connected to said extension of said second contact for providing input information signals, at a frequency equal to the difference between said pump and idler frequencies, to be amplified and receiving outgoing amplified information signals for further processing.

References Cited by the Examiner

UNITED STATES PATENTS

| | | | |
|---|---|---|---|
| 3,094,672 | 6/1963 | Lewis et al. | 330—4.9 |
| 3,111,629 | 11/1963 | Harris | 330—4.9 |

FOREIGN PATENTS

| | | |
|---|---|---|
| 884,325 | 12/1961 | Great Britain. |

ROY LAKE, *Primary Examiner.*